(12) United States Patent
Nylander et al.

(10) Patent No.: US 9,739,867 B2
(45) Date of Patent: Aug. 22, 2017

(54) METHODS AND APPARATUS FOR DETERMINING RELATIONSHIPS IN HETEROGENEOUS NETWORKS

(75) Inventors: Tomas Nylander, Värmdö (SE);
Per-Daniel Stålnacke, Bromma (SE);
Oscar Zee, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 111 days.

(21) Appl. No.: 14/421,658

(22) PCT Filed: Aug. 15, 2012

(86) PCT No.: PCT/EP2012/065970
§ 371 (c)(1),
(2), (4) Date: Nov. 10, 2015

(87) PCT Pub. No.: WO2014/026715
PCT Pub. Date: Feb. 20, 2014

(65) Prior Publication Data
US 2016/0069984 A1    Mar. 10, 2016

(51) Int. Cl.
*G01S 5/02* (2010.01)
*H04W 64/00* (2009.01)

(52) U.S. Cl.
CPC .......... *G01S 5/0242* (2013.01); *H04W 64/00* (2013.01)

(58) Field of Classification Search
CPC ... H04W 4/02; H04W 16/14; H04W 36/0033; H04W 36/0066; H04W 36/14;
(Continued)

(56) References Cited

U.S. PATENT DOCUMENTS

| 6,259,923 B1 * | 7/2001 | Lim | H04W 64/00 455/456.2 |
| 7,764,660 B2 * | 7/2010 | Verma | H04L 29/06 370/338 |

(Continued)

FOREIGN PATENT DOCUMENTS

WO    2007121331 A2    10/2007

OTHER PUBLICATIONS

3GPP, TSG-SA # 16, Tdoc SP-020379, Cover Page for TR 23.871 v 2.1.0, Jun. 14, 2002.*
3GPP TS 23.032 V10.0.0; 3rd Generation Partnership Project; Technical Specification Group Services and System Aspects; Universal Geographical Area Description (GAD) (Release 10); Mar. 2011.
(Continued)

*Primary Examiner* — Michael Thier
*Assistant Examiner* — Eric Nowlin
(74) *Attorney, Agent, or Firm* — Patent Portfolio Builders, PLLC (57) ABSTRACT

A method enables automatic determination that an area covered by an Access Point (AP) of a Wi-Fi Radio Access Network (RAN) overlaps with a cell of a 3$^{rd}$ Generation Partnership Project (3GPP) RAN. The method comprises, at an entity of the Wi-Fi RAN, obtaining a 3GPP identifier related to a user terminal that is attached to the Wi-Fi RAN and an identifier for an AP of the Wi-Fi RAN to which the terminal is attached. The method further comprises, at the entity, generating and sending a Location Service Request including the 3GPP identifier to a Location Services (LCS) Server associated with the 3GPP RAN, receiving a Location Service Response from the LCS Server that includes information identifying a cell of the 3GPP RAN in which the user terminal is located, and causing storage of an association between the identified Wi-Fi AP and the identified 3GPP cell.

25 Claims, 6 Drawing Sheets

(58) Field of Classification Search
CPC ..... H04W 36/32; H04W 48/08; H04W 48/16; H04W 48/18; H04W 64/00; H04W 64/003; H04W 84/042; H04W 84/12; H04W 88/06; G01S 5/0242; G01S 5/0257; G01S 5/0263; H04L 12/66

See application file for complete search history.

(56) References Cited

U.S. PATENT DOCUMENTS

| | | | | |
|---|---|---|---|---|
| 7,831,216 B1* | 11/2010 | Yenney | H04W 64/003 | 455/88 |
| 7,899,451 B2* | 3/2011 | Hu | H04W 48/17 | 370/328 |
| 7,962,152 B2* | 6/2011 | Buerger | H04W 4/02 | 455/440 |
| 8,099,109 B2* | 1/2012 | Altman | G06Q 30/0207 | 455/414.3 |
| 8,301,161 B2* | 10/2012 | Li | G01S 5/30 | 370/345 |
| 8,379,558 B2* | 2/2013 | Lohtia | H04W 36/14 | 370/312 |
| 8,478,299 B2* | 7/2013 | Chatterjee | G01S 1/68 | 455/434 |
| 8,635,335 B2* | 1/2014 | Raleigh | H04W 36/245 | 455/456.3 |
| 8,639,266 B2* | 1/2014 | Zelinka | G01S 5/0284 | 455/404.1 |
| 8,644,818 B1* | 2/2014 | Okmyanskiy | H04W 64/003 | 370/331 |
| 8,660,574 B2* | 2/2014 | Edge | G01S 5/0018 | 455/456.1 |
| 8,676,118 B2* | 3/2014 | Sheynblat | G01S 5/0236 | 370/328 |
| 8,682,350 B2* | 3/2014 | Altman | G06Q 30/0207 | 455/414.3 |
| 8,805,401 B2* | 8/2014 | Kosolobov | G01S 5/0263 | 370/338 |
| 8,983,433 B2* | 3/2015 | Torres | H04W 12/06 | 370/230 |
| 9,031,580 B2* | 5/2015 | Alizadeh-Shabdiz | H04W 4/02 | 370/338 |
| 9,143,891 B2* | 9/2015 | Choi | H04W 4/02 | |
| 9,143,920 B2* | 9/2015 | Do | H04W 4/02 | |
| 9,386,408 B2* | 7/2016 | Edge | G01S 5/0018 | |
| 9,462,412 B1* | 10/2016 | Ramachandran | G06F 17/3087 | |
| 9,510,256 B2* | 11/2016 | Krishna | H04W 36/22 | |
| 9,538,496 B2* | 1/2017 | Sheynblat | G01S 5/0236 | |
| 9,585,088 B2* | 2/2017 | Hanson | H04L 63/0853 | |
| 2004/0033803 A1* | 2/2004 | Varonen | H04W 4/02 | 455/435.1 |
| 2004/0203914 A1* | 10/2004 | Kall | H04W 8/10 | 455/456.1 |
| 2004/0259546 A1 | 12/2004 | Balachandran | | |
| 2005/0232189 A1* | 10/2005 | Loushine | H04W 64/00 | 370/328 |
| 2005/0239461 A1* | 10/2005 | Verma | H04L 29/06 | 455/435.1 |
| 2005/0272424 A1* | 12/2005 | Gallagher | H04W 60/00 | 455/435.1 |
| 2005/0272440 A1 | 12/2005 | Li | | |
| 2006/0094446 A1* | 5/2006 | Duan | G06F 9/505 | 455/456.3 |
| 2006/0133319 A1* | 6/2006 | Kant | H04L 63/10 | 370/331 |
| 2006/0245406 A1* | 11/2006 | Shim | H04L 63/0272 | 370/338 |
| 2007/0123215 A1* | 5/2007 | Wang | G06Q 10/087 | 455/411 |
| 2008/0076425 A1* | 3/2008 | Khetawat | H04W 88/12 | 455/436 |
| 2008/0133336 A1* | 6/2008 | Altman | G06Q 30/0207 | 455/456.1 |
| 2008/0139218 A1* | 6/2008 | Duan | H04M 15/00 | 455/456.2 |
| 2008/0227468 A1* | 9/2008 | Niska | H04W 64/00 | 455/456.2 |
| 2008/0248813 A1* | 10/2008 | Chatterjee | G01S 1/68 | 455/456.2 |
| 2008/0293431 A1* | 11/2008 | Buerger | H04W 4/02 | 455/456.1 |
| 2009/0023453 A1* | 1/2009 | Hu | H04W 48/17 | 455/452.1 |
| 2009/0059829 A1* | 3/2009 | Bachmann | H04W 36/14 | 370/311 |
| 2009/0075625 A1* | 3/2009 | Jackson | H04W 4/22 | 455/404.1 |
| 2009/0253440 A1* | 10/2009 | Edge | G01S 5/0018 | 455/456.2 |
| 2009/0262733 A1 | 10/2009 | Olson | | |
| 2010/0046406 A1* | 2/2010 | Annamalai | H04W 64/00 | 370/310 |
| 2010/0323700 A1* | 12/2010 | Bachmann | H04W 36/0066 | 455/436 |
| 2011/0051665 A1* | 3/2011 | Huang | G01S 5/0027 | 370/328 |
| 2011/0159862 A1* | 6/2011 | Jackson | G01S 5/02 | 455/418 |
| 2011/0250903 A1* | 10/2011 | Huang | G01S 5/0263 | 455/456.1 |
| 2011/0250906 A1* | 10/2011 | Siomina | H04W 4/02 | 455/456.2 |
| 2011/0320588 A1* | 12/2011 | Raleigh | H04W 36/245 | 709/224 |
| 2012/0108258 A1* | 5/2012 | Li | G01S 5/30 | 455/456.1 |
| 2012/0184288 A1 | 7/2012 | Kosolobov | | |
| 2012/0202517 A1* | 8/2012 | Edge | H04W 4/023 | 455/456.1 |
| 2012/0220314 A1* | 8/2012 | Altman | G06Q 30/0207 | 455/456.3 |
| 2012/0297055 A9* | 11/2012 | Raleigh | H04W 36/245 | 709/224 |
| 2012/0322412 A1* | 12/2012 | Qiang | H04W 48/16 | 455/411 |
| 2013/0077482 A1* | 3/2013 | Krishna | H04W 36/22 | 370/230 |
| 2013/0115956 A1* | 5/2013 | Ewert | H04W 48/08 | 455/437 |
| 2013/0252635 A1* | 9/2013 | Zheng | H04W 4/021 | 455/456.2 |
| 2013/0281110 A1* | 10/2013 | Zelinka | G01S 5/0284 | 455/456.1 |
| 2014/0094142 A1* | 4/2014 | Torres | H04W 12/06 | 455/411 |
| 2014/0141804 A1* | 5/2014 | Zelinka | G01S 5/0284 | 455/456.2 |
| 2014/0192643 A1* | 7/2014 | Kalapatapu | H04W 48/00 | 370/230 |
| 2014/0206390 A1* | 7/2014 | Edge | G01S 5/0018 | 455/456.2 |
| 2014/0282883 A1* | 9/2014 | Chan | H04L 63/10 | 726/4 |
| 2014/0335823 A1* | 11/2014 | Heredia | H04L 12/5895 | 455/411 |
| 2014/0364101 A1* | 12/2014 | Do | H04W 4/02 | 455/418 |
| 2015/0023341 A1* | 1/2015 | Zhao | H04W 48/18 | 370/338 |
| 2015/0117411 A1* | 4/2015 | Jeong | H04W 64/00 | 370/331 |
| 2015/0133160 A1* | 5/2015 | Sheynblat | G01S 5/0236 | 455/456.2 |
| 2015/0163680 A1* | 6/2015 | Valliappan | H04W 16/14 | 370/329 |
| 2015/0189557 A1* | 7/2015 | Touati | H04W 36/0066 | 370/332 |
| 2015/0195771 A1* | 7/2015 | Hurtta | H04W 48/08 | 370/338 |

(56) References Cited

U.S. PATENT DOCUMENTS

| | | | | |
|---|---|---|---|---|
| 2015/0296478 | A1* | 10/2015 | Rasanen | H04L 65/104 455/456.1 |
| 2015/0334644 | A1* | 11/2015 | Kim | H04W 48/18 370/329 |
| 2015/0365790 | A1* | 12/2015 | Edge | H04W 72/1263 455/404.2 |
| 2016/0069984 | A1* | 3/2016 | Nylander | G01S 5/0242 370/328 |
| 2016/0094977 | A1* | 3/2016 | Nylander | H04W 36/14 370/328 |
| 2016/0105780 | A1* | 4/2016 | Hooker | H04L 65/1016 370/338 |
| 2016/0205557 | A1* | 7/2016 | Tuupola | H04L 63/107 455/411 |
| 2016/0226886 | A1* | 8/2016 | Steiner | G01S 5/0063 |
| 2016/0234726 | A1* | 8/2016 | Nuggehalli | H04W 36/0022 |
| 2016/0258766 | A1* | 9/2016 | Felemban | G08G 1/096741 |
| 2016/0261986 | A1* | 9/2016 | Nord | H04W 4/023 |
| 2016/0286357 | A1* | 9/2016 | Edge | G01S 5/0018 |
| 2016/0316031 | A1* | 10/2016 | Diem | G06Q 10/00 |
| 2017/0034650 | A1* | 2/2017 | Shah | H04W 4/02 |
| 2017/0078846 | A1* | 3/2017 | Sheynblat | H04W 4/023 |

OTHER PUBLICATIONS

3GPP TS 23.271 V10.2.0; 3rd Generation Partnership Project; Technical Specification Group Services and System Aspects; Functional stage 2 description of Location Services (LCS) (Release 10); Mar. 2011.

\* cited by examiner

METHODS AND APPARATUS FOR DETERMINING RELATIONSHIPS IN HETEROGENEOUS NETWORKS

This application is a 371 of PCT/EP2012/065970, filed Aug. 15, 2012, the disclosure of which is fully incorporated herein by reference.

TECHNICAL FIELD

The present invention relates to methods and apparatus for determining relationships in heterogeneous networks. More particularly, the invention relates to methods and apparatus for automatically determining when an area covered by an Access Point of a Wi-Fi Radio Access Network overlaps with a cell of a 3GPP RAN, such as a UTRAN or EUTRAN.

BACKGROUND

Data traffic in mobile telecommunications networks is continually increasing. Consequently, operators are employing heterogeneous access networks that utilise multiple radio access technologies (RATs) in order to provide greater capacity, particularly in high traffic areas and areas that otherwise have poor network coverage.

Figure 1:
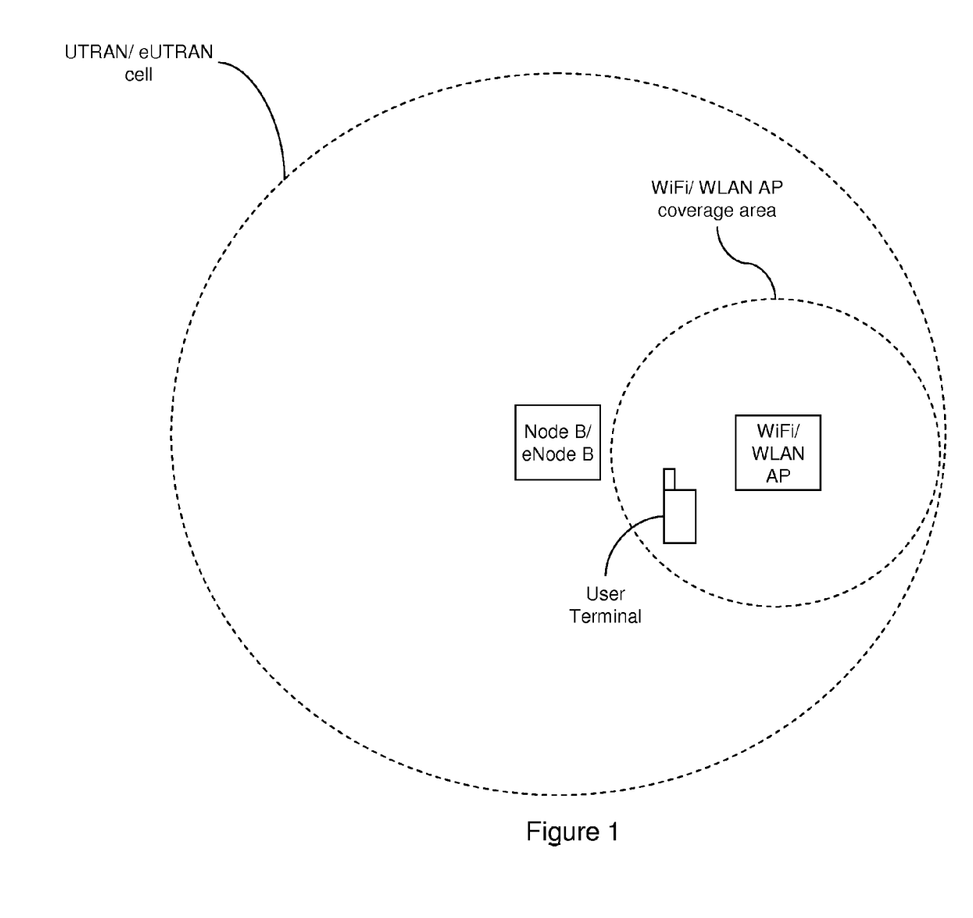
FIG. 1 illustrates schematically a Wi-Fi AP whose coverage area overlaps with a 3GPP cell.

Typically, the radio access technologies utilised as part of these heterogeneous access networks include Universal Terrestrial Radio Access Network (UTRAN), Evolved UTRAN (EUTRAN), and Wi-Fi/WLAN (Wireless Local Area Network). In this regard, both the UMTS and LTE standards are defined by the 3rd Generation Partnership Project (3GPP), whilst the Wi-Fi/WLAN standards are defined by the Institute of Electrical and Electronics Engineers (IEEE). However, one problem that arises when attempting to make use of heterogeneous networks that combine both 3GPP RANs and Wi-Fi RANs/WLANs is that the network operator cannot easily establish how the coverage of the cells of a 3GPP RAN (i.e. provided by a Node B/eNode B) relates to the coverage provided by the Access Points (AP) of a Wi-Fi RAN/WLAN. For example, FIG. 1 illustrates schematically a Wi-Fi AP whose coverage area overlaps with a 3GPP cell. In this regard, it is practically impossible to determine and maintain this coverage information manually, as 3GPP cells and Wi-Fi/WLAN APs within these RANs are added and/or changed at a relatively rapid rate. Furthermore, the effort required to manually configure this coverage information into the network management systems would be huge.

It would therefore be desirable to provide a mechanism by which the relationships between the cells of a 3GPP RAN and the coverage area of the APs of a Wi-Fi RAN could be determined automatically. However, the 3GPP and Wi-Fi technologies are part of separate domains that use different management systems, different paradigms, different identities etc., such that there are no mechanisms that allow a 3GPP RAN and a Wi-Fi RAN to associate with one another in this way.

SUMMARY

It is therefore an object of the present invention to provide methods and apparatus for automatically determining when an area covered by an Access Point (AP) of a Wi-Fi Radio Access Network (RAN) overlaps with a cell of a 3GPP RAN, such as a UTRAN or EUTRAN.

According to a first aspect there is provided a method of enabling automatic determination of when an area covered by an Access Point (AP) of a Wi-Fi Radio Access Network (RAN) overlaps with a cell of a 3GPP RAN. The method comprises, at an entity of the Wi-Fi RAN, obtaining a 3GPP identifier related to a user terminal that is attached to the Wi-Fi RAN and an identifier for an AP of the Wi-Fi RAN to which the terminal is attached. The entity then generates and sends a Location Service Request including the 3GPP identifier to a Location Services (LCS) Server associated with the 3GPP RAN, receiving a Location Service Response from the LCS Server that includes information identifying a cell of the 3GPP RAN in which the user terminal is located, and causes storage of an association between the identified Wi-Fi AP and the identified 3GPP cell.

The method may further comprise configuring the Wi-Fi entity to function as a LCS Client of the LCS Server.

The Location Service Request may indicate that an identifier of the 3GPP cell is required. The Location Service Response may include an identifier of the 3GPP cell.

The step of causing storage of an association between the identified Wi-Fi AP and the identified 3GPP cell may comprise storing the association at the entity of the Wi-Fi RAN. It may then be determined that the area covered by the Wi-Fi AP overlaps with the identified 3GPP cell if the number of stored associations between the identified Wi-Fi AP and the identified 3GPP cell exceeds a threshold. Alternatively, it may be determined that the area covered by the Wi-Fi AP overlaps with the identified 3GPP cell upon the generation and storage of an association between the identified Wi-Fi AP and the identified 3GPP cell.

The method may further comprise, at the Wi-Fi entity, recording an indication of the time at which an association is generated, and, if a further association between the Wi-Fi AP and the identified 3GPP cell is not generated within a specified time period, cancelling the association between the Wi-Fi AP and the identified 3GPP cell The association between the identified Wi-Fi AP and the identified 3GPP cell may be stored in overlap information identifying one or more APs of the Wi-Fi RAN that may overlap with one or more cells of the 3GPP RAN.

Alternatively, the step of causing storage of an association between the identified Wi-Fi AP and the identified 3GPP cell may comprise sending the association for storage at a further entity.

The Wi-Fi entity may generate and send a Location Service Request upon receipt of a 3GPP identifier associated with the user terminal. The Wi-Fi entity may receive an attachment notification from a Wi-Fi Access Controller, the notification including the 3GPP identifier associated with the user terminal.

The Wi-Fi entity may be a Wi-Fi Access Controller. The Wi-Fi entity may then obtain the 3GPP identifier during authentication of the user terminal in the Wi-Fi RAN.

The 3GPP identifier may be an International Mobile Subscriber Identity (IMSI) associated with the user terminal. The user terminal may be authenticated using any one of Extensible Authentication Protocol Method for Global System for Mobile Communications Subscriber Identity Modules, EAP-SIM, and Extensible Authentication Protocol Method for 3rd Generation Authentication and Key Agreement, EAP-AKA.

According to a second aspect there is provided a method of operating a Location Services (LCS) Server associated with a 3GPP Radio Access Network (RAN). The method comprises receiving a Location Service Request from an LCS Client within a Wi-Fi RAN, the Location Service Request including a 3GPP identifier related to a user terminal. The method further comprises determining that the LCS Server should respond to the Location Service Request with location information identifying a cell of the 3GPP RAN in which the user terminal is located, obtaining location information identifying a cell of the 3GPP RAN, and generating and sending a Location Service Response to the LCS Client within the Wi-Fi RAN, the Location Service Response including the information identifying a cell of the 3GPP RAN.

The step of determining that the LCS Server should respond to the Location Service Request with location information identifying a cell of the 3GPP RAN may comprise determining that the Location Service Request includes an indication that the LCS Server should respond with location information identifying a cell of the 3GPP RAN.

Alternatively, the step of determining that the LCS Server should respond to the Location Service Request with location information identifying a cell of the 3GPP RAN may comprises obtaining an identifier for the LCS Client from the Location Service Request, and determining that the identified LCS Client requires location information identifying a cell of the 3GPP RAN.

According to a third aspect there is provided an entity of a Wi-Fi Radio Access Network (RAN) configured to enable automatic determination of when an area covered by an Access Point (AP) of the Wi-Fi RAN overlaps with a cell of a 3GPP RAN. The entity comprises:
  a receiver configured to receive a 3GPP identifier related to a user terminal that is attached to the Wi-Fi RAN and an identifier for an AP of the Wi-Fi RAN to which the terminal is attached;
  a processor configured to generate a Location Service Request including the 3GPP identifier;
  a transmitter configured to send the Location Service Request to a Location Services (LCS) Server associated with the 3GPP RAN;
  the receiver being further configured to receive a Location Service Response from the LCS Server that includes information identifying a cell of the 3GPP RAN in which the user terminal is located; and
  the processor being further configured to cause storage of an association between the identified Wi-Fi AP and the identified 3GPP cell.

The entity may be configured to function as a LCS Client of the LCS Server.

The processor may be configured to generate a Location Service Request that indicates that an identifier of a 3GPP cell is required. The receiver may be configured to receive a Location Service Response that includes an identifier of the 3GPP cell.

The entity may further comprise a memory configured to store the association between the identified Wi-Fi AP and the identified 3GPP cell, and the processor may be configured to cause storage of an association between the identified Wi-Fi AP and the identified 3GPP cell by storing the association in the memory. The processor is may be further configured to determine that the area covered by the Wi-Fi AP overlaps with the identified 3GPP cell if the number of stored associations between the identified Wi-Fi AP and the identified 3GPP cell exceeds a threshold. Alternatively, the processor may be further configured to determine that the area covered by the Wi-Fi AP overlaps with the identified 3GPP cell upon the storage of an association between the identified Wi-Fi AP and the identified 3GPP cell.

The processor may be further configured to record an indication of the time at which an association is generated, and to cancel the association between the Wi-Fi AP and the identified 3GPP cell if a further association between the Wi-Fi AP and the identified 3GPP cell is not generated within a specified time period.

The memory may be configured to store the association between the identified Wi-Fi AP and the identified 3GPP cell in overlap information identifying one or more APs of the Wi-Fi RAN that may overlap with one or more cells of the 3GPP RAN.

Alternatively, the processor may be configured to cause storage of an association between the identified Wi-Fi AP and the identified 3GPP cell by sending the association for storage at a further entity.

The processor may be configured to generate a Location Service Request upon receipt of a 3GPP identifier associated with the user terminal.

The receiver may be configured to receive an attachment notification from a Wi-Fi Access Controller, the notification including the 3GPP identifier associated with the user terminal.

Alternatively, the entity may be a Wi-Fi Access Controller. The receiver may then be configured to receive the 3GPP identifier during authentication of the user terminal in the Wi-Fi RAN. The processor may be further configured to authenticate the user terminal using any one of Extensible Authentication Protocol Method for Global System for Mobile Communications Subscriber Identity Modules (EAP-SIM) and Extensible Authentication Protocol Method for 3rd Generation Authentication and Key Agreement (EAP-AKA), such that the 3GPP identifier is an International Mobile Subscriber Identity (IMSI) associated with the user terminal.

According to a fourth aspect there is provided a Location Services (LCS) Server associated with a 3GPP Radio Access Network (RAN) and configured to provide location information to a Wi-Fi RAN. The LCS Server comprises:
  a receiver configured to receive a Location Service Request from a LCS Client within the Wi-Fi RAN, the Location Service Request including a 3GPP identifier related to a user terminal;
  a processor configured to determine that the LCS Server should respond to the Location Service Request with location information identifying a cell of the 3GPP RAN in which the user terminal is located;
  the processor being configured to obtain location information identifying a cell of the 3GPP RAN in which the user terminal is located and to generate a Location Service Response including the information identifying a cell of the 3GPP RAN; and
  a transmitter configured to send the Location Service Response to the LCS Client within the Wi-Fi RAN.

The processor may be configured to determine that the LCS Server should respond to the Location Service Request with location information identifying a cell of the 3GPP RAN by determining that the Location Service Request includes an indication that the LCS Server should respond with location information identifying a cell of the 3GPP RAN.

Alternatively, the processor may be configured to determine that the LCS Server should respond to the Location Service Request with location information identifying a cell of the 3GPP RAN by obtaining an identifier for the LCS Client from the Location Service Request, and determining that the identified LCS Client requires location information identifying a cell of the 3GPP RAN.

BRIEF DESCRIPTION OF THE DRAWINGS

Some embodiments of the present invention will now be described in detail with reference to the accompanying drawings, in which.

DETAILED DESCRIPTION

Figure 2:
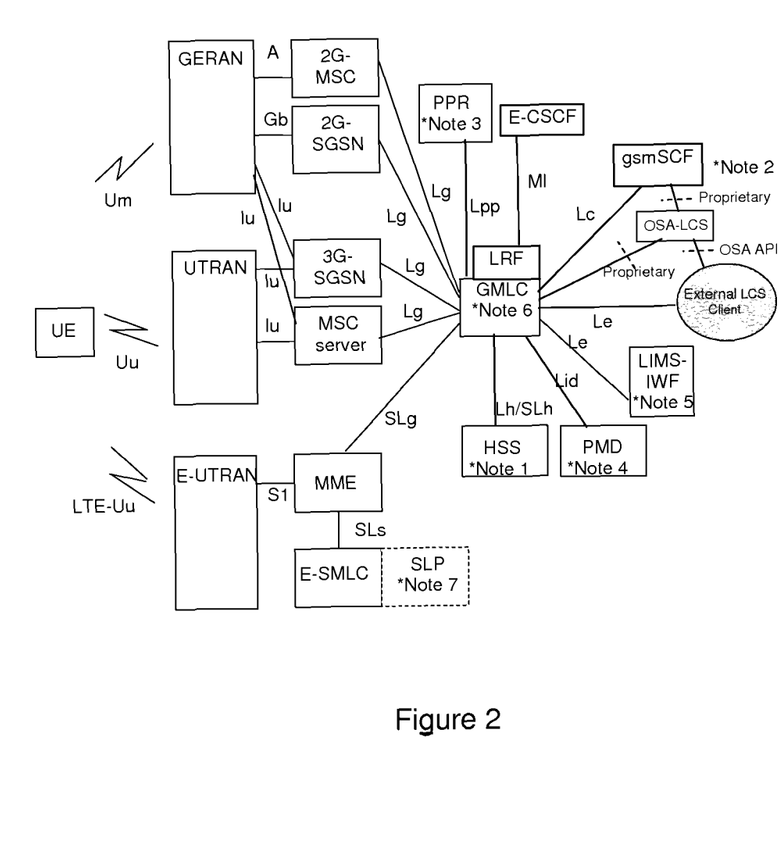
FIG. 2 illustrates the general arrangement of the 3GPP Location Service feature.

There will now be described a method of automatically determining when an area covered by an Access Point (AP) of a Wi-Fi Radio Access Network (RAN) overlaps with a cell of a 3GPP RAN, such as a UTRAN or EUTRAN. The method involves introducing a Location Services (LCS) Client into the Wi-Fi RAN, wherein an LCS Client is an entity defined by the 3GPP Location Service (LCS) specifications. In this regard, the 3GPP Location Service (LCS) specifications define the mechanisms that support 3GPP mobile location services, and an LCS Client is an entity that interacts with an LCS Server for the purpose of obtaining location information for a device/user terminal (e.g. a user equipment (UE) or station (STA). FIG. 2 illustrates the general arrangement of the 3GPP Location Service feature in GSM, UMTS and EPS, including the relation of LCS Clients and servers in the core network with the GERAN, UTRAN and EUTRAN Access Networks.

Figure 3:
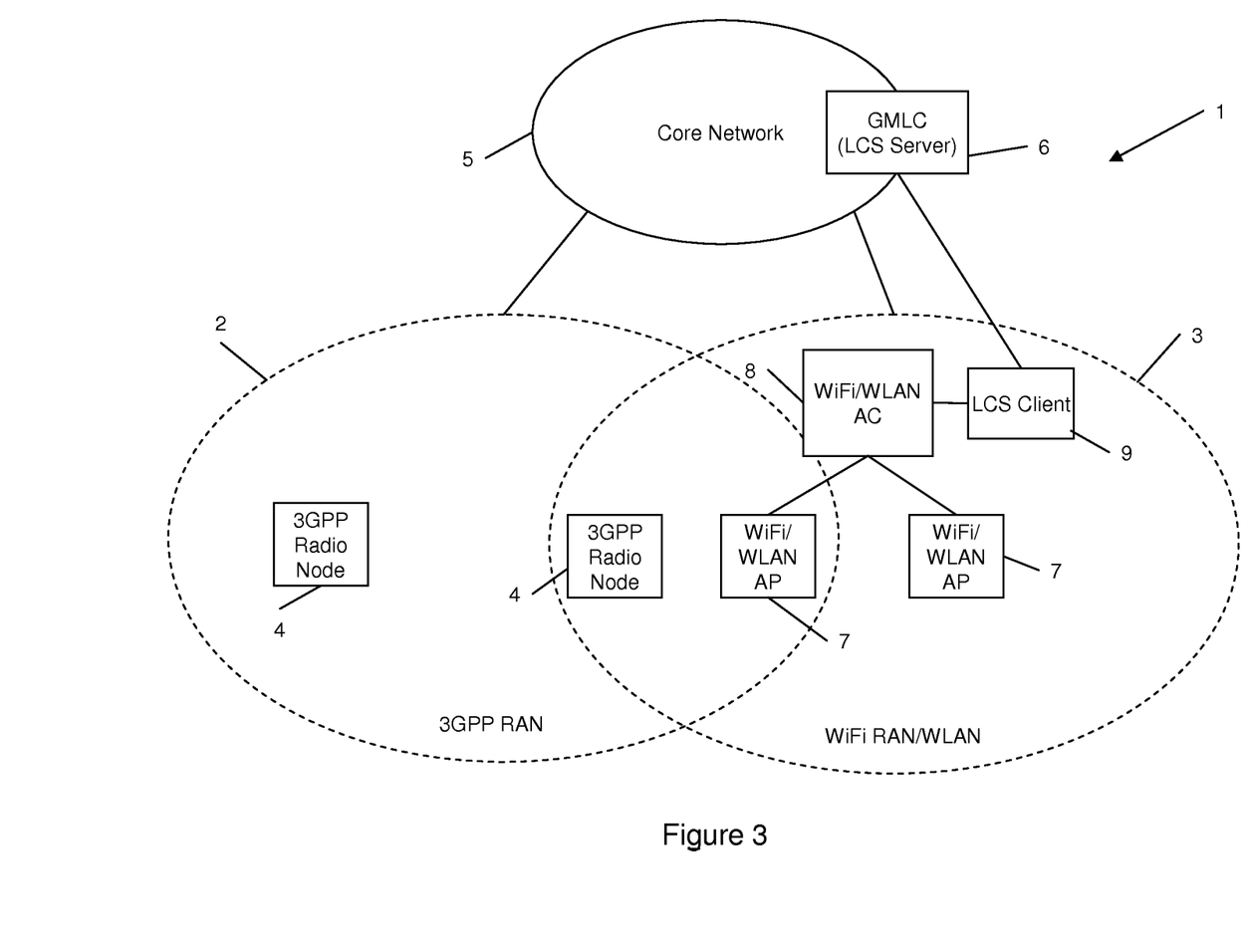
FIG. 3 illustrates schematically a simplified example of a heterogeneous network.

FIG. 3 illustrates schematically a simplified example of a heterogeneous network 1 that comprises a 3GPP RAN 2 and a Wi-Fi RAN 3 suitable for implementing the methods described herein. The 3GPP RAN 2 includes a number of 3GPP radio nodes 4. For example, if the 3GPP RAN was a UTRAN, then these radio nodes would be Node Bs and Radio Network Controllers (RNC). By way of further example, if the 3GPP RAN was an EUTRAN, then these radio nodes would be eNode Bs. The 3GPP RAN 2 is connected to a mobile core network 5 that includes an LCS Server 6, such as a Gateway Mobile Location Centre (GMLC), which supports 3GPP Location Services. The Wi-Fi RAN 3 includes a number of Wi-Fi/WLAN APs 7 that are connected to a Wi-Fi/WLAN Access Controller (AC) 8. The Wi-Fi/WLAN AC 8 can control each of the Wi-Fi/WLAN APs 7 and implements authentication of a mobile station/user terminal that wants to associate with/attach to the Wi-Fi RAN/WLAN 3. In accordance with the methods described herein, the Wi-Fi RAN 3 also includes a Wi-Fi entity configured to implement an LCS Client 9, and which is connected to the LCS Server 6 in the 3GPP core network 5. The LCS Client 9 can be provided as a standalone entity in the Wi-Fi RAN/WLAN (as illustrated) or, alternatively, the Wi-Fi AC 8 could be configured with the LCS Client functionality.

The Wi-Fi entity implementing the LCS Client functionality is configured to obtain a 3GPP identifier associated with a user terminal that has associated with/is attached to the Wi-Fi RAN and an identifier for an AP of the Wi-Fi RAN to which the terminal is associated/attached. In this regard, a 3GPP identifier is an identifier that can be used by an LCS Server to identify the user terminal within the 3GPP RAN. For example, this 3GPP identifier could be the International Mobile Subscriber Identity (IMSI) associated with the user terminal. The Wi-Fi entity/LCS Client is further configured to generate and send a Location Service Request including the 3GPP identifier to a LCS Server associated with the 3GPP RAN, and to receive a Location Service Response from the LCS Server that includes location information identifying a cell of the 3GPP RAN in which the user terminal is located. This location information can therefore be used by the Wi-Fi entity/LCS Client to determine if the identified Wi-Fi AP and the identified 3GPP cell overlap. The Wi-Fi entity/LCS Client is yet further configured to create/generate and store an association between the identified Wi-Fi AP and the identified 3GPP cell, as a result of the Location Service Response.

The 3GPP identifier associated with the user terminal can be obtained during the authentication of the user terminal to the Wi-Fi RAN. For example, if the Wi-Fi entity implementing the LCS Client functionality is the Wi-Fi AC that also implements authentication for the Wi-Fi AP, then the Wi-Fi entity/LCS Client will receive an IMSI from the user terminal during the authentication process, provided that the user terminal is authenticated using either Extensible Authentication Protocol Method for Global System for Mobile Communications Subscriber Identity Modules, (EAP-SIM) or Extensible Authentication Protocol Method for 3rd Generation Authentication and Key Agreement (EAP-AKA). As an alternative example, if the LCS Client functionality is provided by a standalone Wi-Fi entity, then the Wi-Fi entity/LCS Client can be configured to receive a message from the Wi-Fi AC notifying the Wi-Fi entity/LCS Client that a user terminal has associated with/attached to a Wi-Fi AP and has been authenticated. This notification message can then include an identifier for the Wi-Fi AP and an IMSI associated with the user terminal.

The Wi-Fi entity/LCS Client can be configured to generate a Location Service Request that includes an explicit indication that an identifier for a 3GPP cell is required in the location information provided in the Location Service Response. Alternatively, the Location Service Request could merely identify the LCS Client that generated the Location Service Request, and the LCS Server could be configured to recognise that this LCS Client requires that an identifier for a 3GPP cell is provided in the location information provided in the Location Service Response. For example, the LCS Server could be configured with a list of LCS Clients that require the location information includes a 3GPP cell identifier.

Upon receipt of the Location Service Response, the Wi-Fi entity/LCS Client can use the location information included in the Location Service Response to determine if the area covered by the identified Wi-Fi AP overlaps with the identified 3GPP cell. To do so, the Wi-Fi entity/LCS Client generates and stores an association between the identified Wi-Fi AP and the 3GPP cell identified in the Location Service Response. The Wi-Fi entity/LCS Client can then be configured to use the stored associations to determine if the identified Wi-Fi AP overlaps with the identified 3GPP cell. For example, the Wi-Fi entity/LCS Client can be configured to determine that the area covered by the identified Wi-Fi AP overlaps with the identified 3GPP cell once a single association between the identified Wi-Fi AP and the identified 3GPP cell has been generated as a result of a Location Service Response. Alternatively, the Wi-Fi entity/LCS Client can be configured to only determine that the area covered by the identified Wi-Fi AP overlaps with the identified 3GPP cell once the number of associations between the identified Wi-Fi AP and the identified 3GPP cell exceeds a threshold. In this case, the requirement that the number of associations must exceed a threshold prevents the Wi-Fi entity/LCS Client from determining that there is an overlap as result of a spurious association (e.g. that could occur due to a change in the layout of the cells of the 3GPP RAN, or due to a change in the radio environment).

In addition, the Wi-Fi entity/LCS Client can be configured to record an indication of the time at which an association between an identified Wi-Fi AP and an identified 3GPP cell is generated. The Wi-Fi entity/LCS Client can be configured to cancel or delete this association if a further association between the identified Wi-Fi AP and the identified 3GPP cell is not generated within a specified time period. By way of example, if the Wi-Fi entity/LCS Client generates a first association following the receipt of a Location Service Response from an LCS Server, the Wi-Fi entity/LCS Client could be configured to cancel or delete that first association if a second association relating to the same Wi-Fi AP and 3GPP cell as the first association is not generated within an hour of the generation of the first association.

When the Wi-Fi entity/LCS Client determines that the area covered by a Wi-Fi AP overlaps with the a 3GPP cell, the Wi-Fi entity/LCS Client can be configured to store an association between the Wi-Fi AP and the 3GPP cell in overlap information. This overlap information therefore identifies one or more APs of the Wi-Fi RAN that may overlap with one or more cells of the 3GPP RAN, and can be used to relate the activity within the Wi-Fi RAN with that of the 3GPP RAN. For example, this overlap information could be distributed for use in performing load steering between the two RANs, or to correlate statistics between the two RANs. For example, this overlap information could be distributed to either or both of the Wi-Fi and 3GPP systems for use when implementing load steering or statistics correlation. Alternatively, this overlap information could be distributed to a functional entity that is capable of communicating with both the 3GPP RAN and the Wi-Fi RAN. For example, such a functional entity could be located in the Operational Support System (OSS) of the network provider.

Figure 4:
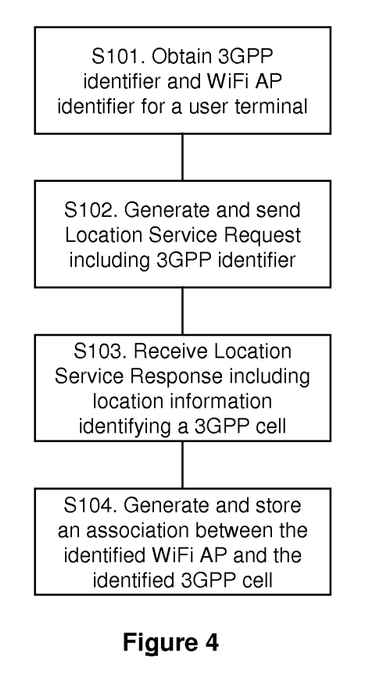
FIG. 4 is a flow diagram illustrating an example of the procedure implemented by a Wi-Fi entity in accordance with the methods described herein.

FIG. 4 is a flow diagram illustrating an example of the procedure implemented by a Wi-Fi entity that is configured to implement an LCS Client in order to determine overlap information for a Wi-Fi RAN and a 3GPP RAN. The steps performed are as follows:

S101. The Wi-Fi entity/LCS Client obtains a 3GPP identifier associated with a user terminal that has associated with/is attached to the Wi-Fi RAN and an identifier for an AP of the Wi-Fi RAN to which the terminal has associated/is attached.

S102. The Wi-Fi entity/LCS Client subsequently generates and sends a Location Service Request including the 3GPP identifier to a LCS Server associated with the 3GPP RAN.

S103. The Wi-Fi entity/LCS Client receives a Location Service Response from the LCS Server that includes information identifying a cell of the 3GPP RAN in which the user terminal is located.

S104. As a result of the Location Service Response, the Wi-Fi entity/LCS Client causes storage of an association between the identified Wi-Fi AP and the identified 3GPP cell. For example, the Wi-Fi entity/LCS Client could store the association itself, or could send the association to some other functional entity that is capable of communicating with both the 3GPP RAN and the Wi-Fi RAN. Such a functional entity could be located in the Operational Support System (OSS) of the network provider. This functional entity would then make the final determination as to whether the Wi-Fi AP and the 3GPP cell overlap.

Figure 5:
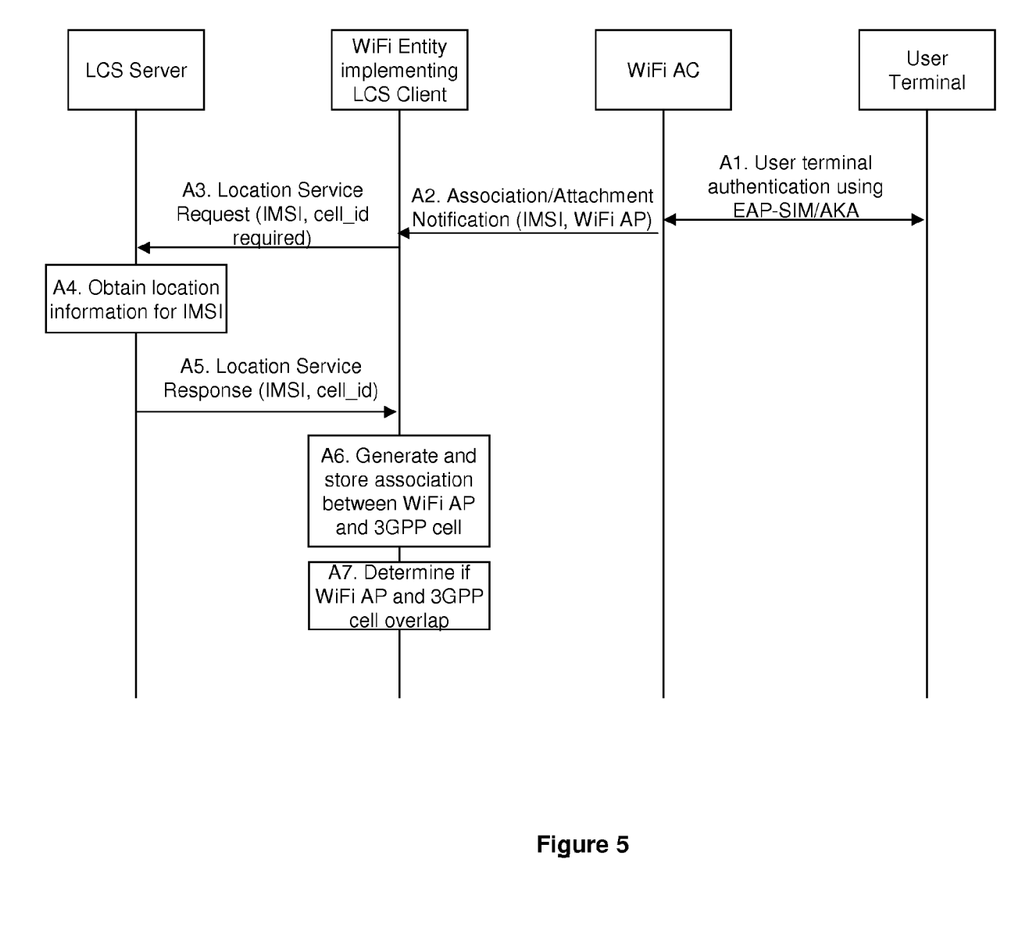
FIG. 5 illustrates an example signalling flow diagram of an implementation of the methods described herein.

FIG. 5 illustrates an example signalling flow diagram of an implementation of the methods described herein. The steps performed are as follows:

A1. A user terminal associates/attaches to a Wi-Fi AP of the Wi-Fi RAN and is authenticated by a Wi-Fi AC using either of EAP-SIM or EAP-AKA. The Wi-Fi AC thereby obtains an IMSI associated with the user terminal and an identifier for the Wi-Fi AP to which the user terminal has associated/attached.

A2. In this example, the Wi-Fi AC generates and sends an association/attachment notification to a Wi-Fi entity that is configured to implement an LCS Client. The association/attachment notification notifies the LCS Client that the user terminal has associated/attached to the Wi-Fi AP, and includes the IMSI associated with the user terminal and the identifier for the Wi-Fi AP. Alternatively, this step can be omitted if the Wi-Fi AC is configured to implement an LCS Client.

A3. The LCS Client within the Wi-Fi RAN receives the association/attachment notification from the Wi-Fi AC and stores the included association/attachment information (i.e. the IMSI and the Wi-Fi AP identifier). The LCS Client then generates and sends a Location Service Request to an LCS Server in the 3GPP core network in order to request location information for the user terminal. The Location Service Request includes the IMSI associated with the user terminal that is associated/attached to the Wi-Fi RAN. As an option, the Location Service Request also includes an explicit indication/request that the location information should include information identifying the 3GPP cell in which the user terminal is location.

A4. The LCS Server in the 3GPP core network receives the Location Service Request from the LCS Client in the Wi-Fi RAN. The LCS Server then uses the IMSI received in the Location Service Request to obtain location information for the user terminal in the 3GPP RAN. In particular, the LCS Server obtains an identifier for the 3GPP cell in which the user terminal is located. For example, the identifier for the 3GPP cell could be a Cell Global Identity (CGI), an Enhanced CGI (ECGI), or a combination of a Cell ID (CID) and Location Area Information (LAI). The procedures by which the LCS Server obtains the location information is beyond the scope of the methods described herein.

A5. The LCS Server generates and sends a Location Service Response to the LCS Client in the Wi-Fi RAN, and includes the IMSI associated with the user terminal and the 3GPP cell identifier for the cell in which it has been determined that the user terminal is located.

A6. The LCS Client in the Wi-Fi RAN receives the Location Service Response from the LCS Server. In this example, it is the LCS Client that determines if the 3GPP cell and the Wi-Fi AP overlap, such that the LCS Client generates and stores an association between the 3GPP cell identified in the Location Service Response and the Wi-Fi AP to which the user terminal has associated/attached. By way of example, if this is the first association between the 3GPP cell and the Wi-Fi AP, then the LCS Client will store the identifier for the 3GPP cell in association with the identifier of the Wi-Fi AP. If this is not the first association between the 3GPP cell and the Wi-Fi AP, such that there have been other preceding associations between the 3GPP cell and the Wi-Fi AP, then the LCS Client can store and indication that there has been a further association between the 3GPP cell and the Wi-Fi AP. For example, whilst the LCS Client would then already store the identifier for the 3GPP cell in association with the identifier of the Wi-Fi AP, the LCS Client could also store the date and time at which each association is generated.

A7. The LCS Client can then use the stored associations to determine if the area covered by the Wi-Fi AP overlaps with the 3GPP cell. For example, the LCS Client could determine that the Wi-Fi AP overlaps with the 3GPP cell after a single association has been generated. Alternatively, the LCS Client could determine that the Wi-Fi AP overlaps with the 3GPP cell when the number of association between the Wi-Fi AP and the 3GPP cell exceeds a threshold.

In order to implement the methods described above the standards that are relevant to the provision of location services should be updated. For example, the 3GPP specifications defining the location services should be updated accordingly, and the Mobile Location Protocol (MLP), defined by the Open Mobile Alliance (OMA), could be extended so as to provide for the inclusion of the 3GPP cell identifier in the location information sent in the Location Service Response message. In addition, MLP could also be extended to provide for the inclusion of an indication/request in a Location Service Request that the location information should include information identifying the cell.

Figure 6:
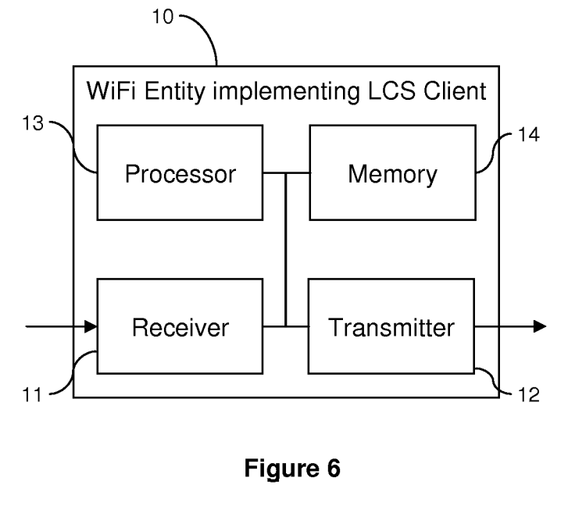
FIG. 6 illustrates schematically an embodiment of a Wi-Fi entity configured to implement the methods described herein.

FIG. 6 illustrates schematically an embodiment of a Wi-Fi entity 10 configured to implement an LCS Client in accordance with the methods described above. The Wi-Fi entity 10 can be implemented as a combination of computer hardware and software and comprises a receiver 11, transmitter 12, a processor 13, and a memory 14. The memory 14 stores the various programs/executable files that are implemented by the processor 13, and also provides a storage unit for any required data. For example, the memory 14 can store any associations between Wi-Fi APs and 3GPP cells that have been generated, and any overlap information identifying one or more Wi-Fi APs that it has been determined overlap with one or more 3GPP cells. The programs/executable files stored in the memory 14, and implemented by the processor, include but are not limited to an LCS Client unit configured to implement the methods described above.

Figure 7:
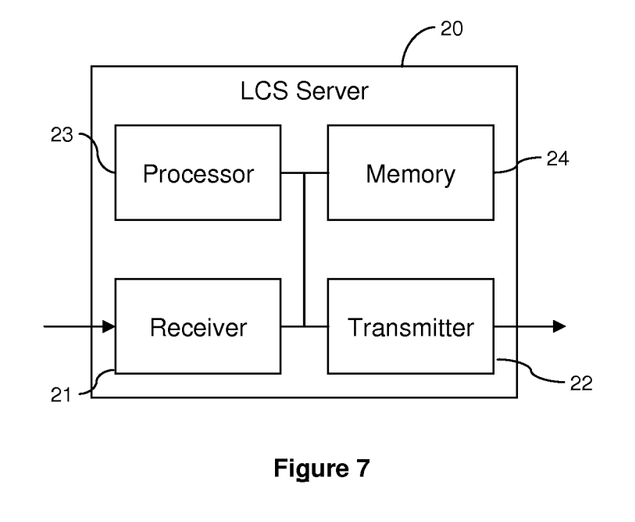
FIG. 7 illustrates schematically an embodiment of a LCS Server configured to implement the methods described herein.

FIG. 7 illustrates schematically an embodiment of a LCS Server 20 configured to implement the methods described above. The LCS Server 20 can be implemented as a combination of computer hardware and software and comprises a receiver 21, transmitter 22, a processor 23, and a memory 24. The memory 24 stores the various programs/executable files that are implemented by the processor 23, and also provides a storage unit for any required data. For example, if required, the memory 24 can store a list of LCS Clients that require any location information provided by the LCS Server includes a 3GPP cell identifier. The programs/executable files stored in the memory 24, and implemented by the processor 23, include but are not limited to a location determination configured to identify the 3GPP cell in which a user terminal is located in accordance with the method described above.

The methods and apparatus described above provide a relatively straightforward mechanism by which the relationships between the cells of a 3GPP RAN and the coverage area of the APs of a Wi-Fi RAN can be determined automatically.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, in the illustrated example signalling flow diagrams described above, only those messages and headers that are of particular relevance are shown. Those skilled in the art will be aware those messages and headers that have not been included in this illustration. In addition, whilst the above described embodiments specifically relate to heterogeneous networks comprised of at least a 3GPP RAN and a Wi-Fi RAN, the principles of the methods described herein are equally applicable to heterogeneous networks that comprise other radio access technologies; such as cdmaOne and CDMA2000.

The invention claimed is:

1. A method enabling automatic determination that an area covered by an Access Point (AP) of a Wi-Fi Radio Access Network (RAN) overlaps with a cell of a $3^{rd}$ Generation Partnership Project (3GPP) RAN, the method comprising, at an entity of the Wi-Fi RAN:
obtaining a 3GPP identifier related to a user terminal that is attached to the Wi-Fi RAN and an identifier for a Wi-Fi AP to which the user terminal is attached;
generating and sending a Location Service Request including the 3GPP identifier to a Location Services (LCS) Server associated with the 3GPP RAN;
receiving a Location Service Response from the LCS Server that includes information identifying the cell of the 3GPP RAN in which the user terminal is located;
causing storage of an association between the identified Wi-Fi AP and the identified 3GPP cell;
recording an indication of a time at which the association between the identified Wi-Fi AP and the identified 3GPP cell is generated; and
when a further association between the identified Wi-Fi AP and the identified 3GPP cell is not generated within a specified time period, cancelling the association between the identified Wi-Fi AP and the identified 3GPP cell.

2. The method of claim 1, further comprising:
configuring the entity of the Wi-Fi RAN to function as an LCS Client of the LCS Server.

3. The method of claim 1, wherein causing the storage of the association between the identified Wi-Fi AP and the identified 3GPP cell comprises storing the association in a memory of the entity of the Wi-Fi RAN.

4. The method of claim 3, wherein it is determined that the area covered by the Wi-Fi AP overlaps with the identified 3GPP cell if the number of stored associations between the identified Wi-Fi AP and the identified 3GPP cell exceeds a threshold.

5. The method of claim 1, wherein causing the storage of the association between the identified Wi-Fi AP and the identified 3GPP cell comprises sending the association for storage at a further entity.

6. The method of claim 1, wherein the entity of the Wi-Fi RAN generates and sends the Location Service Request upon receipt of the 3GPP identifier associated with the user terminal.

7. The method of claim 6, wherein the entity of the Wi-Fi RAN receives an attachment notification from a Wi-Fi Access Controller, the attachment notification including the 3GPP identifier associated with the user terminal.

8. The method of claim 1, wherein the entity of the Wi-Fi RAN is a Wi-Fi Access Controller.

9. The method of claim 8, wherein the entity of the Wi-Fi RAN obtains the 3GPP identifier during authentication of the user terminal in the Wi-Fi RAN.

10. A method of operating a Location Services (LCS) Server associated with a $3^{rd}$ Generation Partnership Project (3GPP) Radio Access Network (RAN) the method comprising:
receiving a Location Service Request from an LCS Client within a Wi-Fi RAN, the Location Service Request including a 3GPP identifier related to a user terminal;
determining that the LCS Server should respond to the Location Service Request with location information identifying a cell of the 3GPP RAN in which the user terminal is located;
obtaining the location information identifying the cell of the 3GPP RAN; and
generating and sending a Location Service Response to the LCS Client within the Wi-Fi RAN, the Location Service Response including the location information identifying the cell of the 3GPP RAN,
wherein the sending of the Location Service Response to the LCS Client causes the LCS Client to:
store an association between an identified Wi-Fi Access Point (AP) and the identified cell of the 3GPP RAN,
record an indication of a time at which the association between the identified Wi-Fi AP and the identified cell of the 3GPP RAN is generated, and
when a further association between the identified Wi-Fi AP and the identified cell of the 3GPP RAN is not generated within a specified time period, cancel the association between the identified Wi-Fi AP and the identified cell of the 3GPP RAN.

11. The method of claim 10, wherein determining that the LCS Server should respond to the Location Service Request with the location information identifying the cell of the 3GPP RAN comprises:
determining that the Location Service Request includes an indication that the LCS Server should respond with the location information identifying the cell of the 3GPP RAN.

12. The method of claim 10, wherein determining that the LCS Server should respond to the Location Service Request with the location information identifying the cell of the 3GPP RAN comprises:
obtaining an identifier for the LCS Client from the Location Service Request; and
determining that the identified LCS Client requires the location information identifying the cell of the 3GPP RAN.

13. A Wi-Fi Radio Access Network (RAN) configured to enable automatic determination that an area covered by an Access Point (AP) of the Wi-Fi RAN overlaps with a cell of a $3^{rd}$ Generation Partnership Project (3GPP) RAN, the Wi-Fi RAN comprising an entity, the entity comprising:
a receiver configured to receive a 3GPP identifier related to a user terminal that is attached to the Wi-Fi RAN and an identifier for a Wi-Fi AP to which the user terminal is attached;
a processor configured to generate a Location Service Request including the 3GPP identifier;
a transmitter configured to send the Location Service Request to a Location Services, (LCS) Server associated with the 3GPP RAN;
the receiver further configured to receive a Location Service Response from the LCS Server that includes information identifying the cell of the 3GPP RAN in which the user terminal is located; and
the processor further configured to:
cause storage of an association between the identified Wi-Fi AP and the identified 3GPP cell;
record an indication of a time at which the association between the identified Wi-Fi AP and the identified 3GPP cell is generated; and
cancel the association between the identified Wi-Fi AP and the identified 3GPP cell when a further association between the identified Wi-Fi AP and the identified 3GPP cell is not generated within a specified time period.

14. The Wi-Fi Radio Access Network of claim 13, wherein the entity is configured to function as an LCS Client of the LCS Server.

15. The Wi-Fi Radio Access Network of claim 13, wherein the entity further comprises a memory configured to store the association between the identified Wi-Fi AP and the identified 3GPP cell, and the processor is further configured to cause the storage of the association between the identified Wi-Fi AP and the identified 3GPP cell by storing the association in the memory.

16. The Wi-Fi Radio Access Network of claim 15, wherein the processor is further configured to determine that the area covered by the Wi-Fi AP overlaps with the identified 3GPP cell if the number of stored associations between the identified Wi-Fi AP and the identified 3GPP cell exceeds a threshold.

17. The Wi-Fi Radio Access Network of claim 15, wherein the processor is further configured to determine that the area covered by the Wi-Fi AP overlaps with the identified 3GPP cell upon the storage of the association between the identified Wi-Fi AP and the identified 3GPP cell.

18. The Wi-Fi Radio Access Network of claim 13, wherein the processor is further configured to cause the storage of the association between the identified Wi-Fi AP and the identified 3GPP cell by sending the association for storage at a further entity.

19. The Wi-Fi Radio Access Network of claim 13, wherein the processor is further configured to generate the Location Service Request upon receipt of the 3GPP identifier associated with the user terminal.

20. The Wi-Fi Radio Access Network of claim 19, wherein the receiver is further configured to receive an attachment notification from a Wi-Fi Access Controller, the attachment notification including the 3GPP identifier associated with the user terminal.

21. The Wi-Fi Radio Access Network of claim 13, wherein the entity is a Wi-Fi Access Controller.

22. The Wi-Fi Radio Access Network of claim 21, wherein the receiver is further configured to receive the 3GPP identifier during authentication of the user terminal in the Wi-Fi RAN.

23. A Location Services (LCS) Server associated with a $3^{rd}$ Generation Partnership Project (3GPP) Radio Access Network (RAN) and configured to provide location information to a Wi-Fi RAN, the LCS Server comprising:
a receiver configured to receive a Location Service Request from an LCS Client within the Wi-Fi RAN, the Location Service Request including a 3GPP identifier related to a user terminal;

a processor configured to determine that the LCS Server should respond to the Location Service Request with the location information identifying a cell of the 3GPP RAN in which the user terminal is located, to obtain the location information identifying the cell of the 3GPP RAN in which the user terminal is located, and to generate a Location Service Response including the location information identifying the cell of the 3GPP RAN;

a transmitter configured to send the Location Service Response to the LCS Client within the Wi-Fi RAN, wherein the transmitter upon sending the Location Service Response to the LCS Client causes the LCS Client to:
    store an association between an identified Wi-Fi Access Point (AP) and the identified cell of the 3GPP RAN,
    record an indication of a time at which the association between the identified Wi-Fi AP and the identified cell of the 3GPP RAN is generated, and
    cancel the association between the identified Wi-Fi AP and the identified cell of the 3GPP RAN when a further association between the identified Wi-Fi AP and the identified cell of the 3GPP RAN is not generated within a specified time period.

24. The LCS Server of claim 23, wherein the processor is further configured to determine that the LCS Server should respond to the Location Service Request with the location information identifying the cell of the 3GPP RAN by determining that the Location Service Request includes an indication that the LCS Server should respond with the location information identifying the cell of the 3GPP RAN.

25. The LCS Server of claim 23, wherein the processor is further configured to determine that the LCS Server should respond to the Location Service Request with the location information identifying the cell of the 3GPP RAN by:
    obtaining an identifier for the LCS Client from the Location Service Request; and
    determining that the identified LCS Client requires the location information identifying the cell of the 3GPP RAN.

* * * * *